(12) United States Patent
Keskula et al.

(10) Patent No.: US 6,406,806 B1
(45) Date of Patent: Jun. 18, 2002

(54) FUEL CELL VOLTAGE MONITORING AND SYSTEM CONTROL

(75) Inventors: Donald H. Keskula, Webster; Bruce J. Clingerman, Palmyra; Robert W. Chalfant, West Henrietta, all of NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/436,819

(22) Filed: Nov. 9, 1999

(51) Int. Cl.[7] ................................................ H01M 8/04
(52) U.S. Cl. ........................................... 429/13; 429/23
(58) Field of Search ............................... 429/13, 23, 22

(56) References Cited

U.S. PATENT DOCUMENTS

| | | |
|---|---|---|
| 4,128,700 A | 12/1978 | Sederquist |
| 4,293,315 A | 10/1981 | Sederquist |
| 4,555,454 A | 11/1985 | Shuster |
| 4,642,272 A | 2/1987 | Sederquist |
| 4,650,727 A | 3/1987 | Vanderborgh et al. |
| 4,659,634 A | 4/1987 | Struthers |
| 4,670,359 A | 6/1987 | Beshty et al. |
| 4,678,723 A | 7/1987 | Wertheim |
| 4,816,353 A | 3/1989 | Wertheim et al. |
| 4,923,768 A | 5/1990 | Kaneko et al. |
| 4,994,331 A | 2/1991 | Cohen |
| 5,248,567 A | 9/1993 | Amemiya et al. |
| 5,271,916 A | 12/1993 | Vanderborgh et al. |
| 5,272,017 A | 12/1993 | Swathirajan et al. |
| 5,316,871 A | 5/1994 | Swathirajan et al. |
| 5,372,617 A | 12/1994 | Kerrebrock et al. |
| 5,429,886 A | 7/1995 | Struthers |
| 5,484,577 A | 1/1996 | Buswell et al. |
| 5,484,666 A | 1/1996 | Gibb et al. |
| 5,518,705 A | 5/1996 | Buswell et al. |
| 5,518,828 A | 5/1996 | Senetar |
| 5,554,453 A | 9/1996 | Steinfeld et al. |
| 5,605,770 A | 2/1997 | Andreoli et al. |
| 5,637,415 A | 6/1997 | Meltser |
| 5,702,838 A | 12/1997 | Yasumoto et al. |
| 5,763,113 A | 6/1998 | Meltser et al. |
| 5,789,091 A | 8/1998 | Wozniczka et al. |

FOREIGN PATENT DOCUMENTS

| | | | |
|---|---|---|---|
| JP | 62-222571 | * | 9/1987 |
| JP | 64-81174 | * | 3/1989 |
| JP | 63-278957 A | * | 5/1990 |
| JP | 4-174975 A | * | 6/1992 |
| JP | 11-154520 A | * | 6/1999 |

OTHER PUBLICATIONS

Szaniszlo, "The Advanced Low–Emissions Catalytic–Combustor Program: Phase I—Description and Status," ASME #79–GT–192, Mar. 1979.

Krill et al., "Catalytic Combustion for System Applications," ASME #79–HT–54, Aug. 1979.

Hall et al., "A Porous Media Burner for Reforming Methanol for Fuel Cell Powered Electric Vehicles," SAE Paper #950095, Feb. 1995.

* cited by examiner

Primary Examiner—Stephen Kalafut
Assistant Examiner—Jonathan Crepeau
(74) Attorney, Agent, or Firm—Cary W. Brooks

(57) ABSTRACT

In an improved method, the voltage of one or more cells in a fuel cell stack is monitored. The monitored voltage is compared to first and second preselected voltage values as a function of load, where the second preselected value is less than the first preselected value. Next, either a first signal is generated if the monitored voltage is less than the first preselected voltage value and greater than or equal to the second preselected voltage value; or a second signal is generated if the monitored voltage is less than the second preselected voltage value.

20 Claims, 3 Drawing Sheets

FUEL CELL VOLTAGE MONITORING AND SYSTEM CONTROL

FIELD OF THE INVENTION

This invention relates to a fuel cell system, and more particularly to a system having a plurality of cells which consume an $H_2$-rich gas to produce power for vehicle propulsion.

BACKGROUND OF THE INVENTION

Fuel cells have been used as a power source in many applications. Fuel cells have also been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a "membrane electrode assembly" (MEA) comprising a thin, proton transmissive, non-electrically conductive, solid polymer membrane-electrolyte having the anode on one of its faces and the cathode on the opposite face. The MEA is sandwiched between a pair of electrically conductive elements which (1) serve as current collectors for the anode and cathode, and (2) contain appropriate channels and/or openings therein for distribution of the fuel cell's gaseous reactants over the surfaces of the respective anode and cathode catalysts. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation, assignee of the present invention, and having as inventors Swathirajan et al. A plurality of individual cells are commonly bundled together to form a PEM fuel cell stack. The term fuel cell is typically used to refer to either a single cell or a plurality of cells (stack) depending on the context. A group of cells within the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture Of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies which comprise the catalyzed electrodes, are relatively expensive to manufacture and require certain controlled conditions in order to prevent damage thereto.

For vehicular applications, it is desirable to use a liquid fuel, preferably a hydrocarbon or alcohol, such as methanol, or gasoline as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished heterogeneously within a chemical fuel processor, known as a reformer, that provides thermal energy throughout a catalyst mass and yields a reformate gas comprising primarily hydrogen and carbon dioxide. For example, in the steam methanol reformation process, methanol and water (as steam) are ideally reacted to generate hydrogen and carbon dioxide according to this reaction: $CH_3OH + H_2O \rightarrow CO_2 + 3H_2$. The reforming reaction is an endothermic reaction, which means it requires external heat for the reaction to occur.

Fuel cell systems which process a hydrocarbon fuel to produce a hydrogen-rich reformate for consumption by PEM fuel cells are known and are described in co-pending U.S. patent application Ser. Nos. 08/975,442, now U.S. Pat. No. 5,887,276, and 08/980,087, now U.S. Pat. No. 6,077,620, filed in the name of William Pettit in November, 1997, and U.S. Ser. No. 09/187,125, now U.S. Pat. No. 6,238,815, Glenn W. Skala et al., filed Nov. 5, 1998, and each assigned to General Motors Corporation, assignee of the present invention.

For vehicular power plants, the reaction within the fuel cell must be carried out under conditions which preserve the integrity of the cell and its valuable polymeric and precious metal catalyst components. Since the anode, cathode and electrolyte layers of the MEA assembly are each formed of polymers, it is evident that the integrity and/or capabilities of such polymers may be adversely affected if exposed to too high a temperature.

SUMMARY OF THE INVENTION

The present invention is directed to an improved method and system to maintain the integrity and capability of the fuel cell stack by detecting a low voltage event and implementing adjustive action. According to the invention, the voltage of individual cells within a fuel cell stack, or the voltage of clusters of cells, is compared to a calibration value. Preferably, multiple calibration voltage values are established based on load. The method and system of the invention are adapted for use in a fuel cell system having a fuel processor which supplies a hydrogen-rich stream to the stack containing fuel cells. In the stack, hydrogen reacts with oxygen to supply electrical power to an external load. By the method of the invention, the voltage of one or more of the cells is monitored. Preferably, the voltage of a cluster of cells is monitored, rather than monitoring individual cells. The monitored voltage is compared to at least one preselected calibration voltage value. A signal is generated if the monitored voltage is less than the preselected value. Preferably, the preselected voltage value is a function of load. More preferably, different preselected values are established for different loads.

In another embodiment, the voltage of one or more cells is monitored; and the monitored voltage is compared to first and second preselected values as a function of load, where the second preselected value is less than the first preselected value. Next, either a first signal is generated if the monitored voltage is less than the first preselected value and greater than or equal to the second preselected value; or a second signal is generated if the monitored voltage is less than the second preselected voltage.

In one embodiment, the first preselected value is selected to correspond to a rate at which the stack is operable to consume the hydrogen-rich stream to satisfy a reduced load. Therefore, when the first signal is generated, the external load is reduced. Preferably when the second signal is generated, indicating a relatively ultra-low voltage condition, the supply of power to the external load is terminated and the fuel cell system is shutdown.

The monitoring and control system of the present invention provides important advantages, particularly in the case where a fuel cell system does not directly monitor the rate of hydrogen flow to the fuel cell. In a fuel cell system, it is important to match the load being demanded of the system with the rate at which reformate gas is supplied to the fuel cell. If it is attempted to draw more current out of the fuel cell than it is capable of supplying because there is not enough hydrogen to create electrical power, this may exceed the acceptable working range of the fuel cell stack and adversely affect the integrity of the stack. Exceeding the acceptable working range of the stack may result in breakdown of the membrane, polymer components. Therefore, it is advantageous to have a control method which provides an early indication where an amount of current is being drawn corresponding to the load demanded, yet stack voltage begins to drop.

Advantageously, the present monitoring and control method is adaptable to, and easily implemented in, existing fuel cell systems. The present method can be implemented in existing fuel cell controllers. In addition, the present monitoring and control method is useable with a variety of fuel cell systems.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

In one aspect, the invention provides a method and system to maintain the integrity of the fuel cell stack by detecting a low voltage event and implementing adjustive action.

In one aspect of the method of the invention, the voltage of a cell cluster is compared to a calibration value. Preferably, the calibration voltage value is established based on a given load. In other words, for every load there is a range of acceptable voltages. There is a first preselected calibration value that serves as an early indication low voltage value providing a signal to take adjustive action. A second preselected calibration value is an ultra-low voltage value which signals the existence of ultra low voltage indicating the need for shutdown. Such first and second preselected calibration values are preferably determined as a function of load. Therefore, as system load changes the comparative calibration values also change. The calibration values are preferably contained in two-dimensional look up tables. The preferred embodiment is described with reference to monitoring cell clusters. The monitoring of cell clusters is more software intensive, and the monitoring of cells individually is more hardware intensive as further described below.

In operation, the system monitors individual cells or clusters of cells, and through a set of software comparators, compares the resulting voltage to one or more calibration values stored in the system's memory. The calibration values may be included in look up tables, or based on plots, curves, empirical data or a mathematical model. The voltage of a cell cluster is compared to a calibration value and if the voltage is lower than a first preselected calibration, it is flagged, and adjustive action is taken. In one embodiment, adjustive action is the reducing of the load demanded by the external circuit. In another embodiment, if the monitored cluster voltage is ultra-low, the system is shutdown. Other actions or responses may include an audio or visual signal, increasing excess air to the cathode, increasing excess hydrogen to the anode, removing load completely, by-passing the stack, CO reduction, and increasing stack pressure and temperature.

Therefore, the first preselected calibration is at a higher voltage than the voltage of the second preselected calibration. The high calibration value provides the opportunity to take adjustment measures to maintain acceptable working ranges. The system provides a signal to the vehicle controller which is responsible for reducing or lowering the load. The lower calibration value signals a shutdown situation and the need for a rapid stop of the system. In each case there is a delay timer in the system that provides a chance to ignore noise or errant signals before a response is made. The overall fuel cell system which utilizes the low voltage detection system will now be described.

Figure 1:
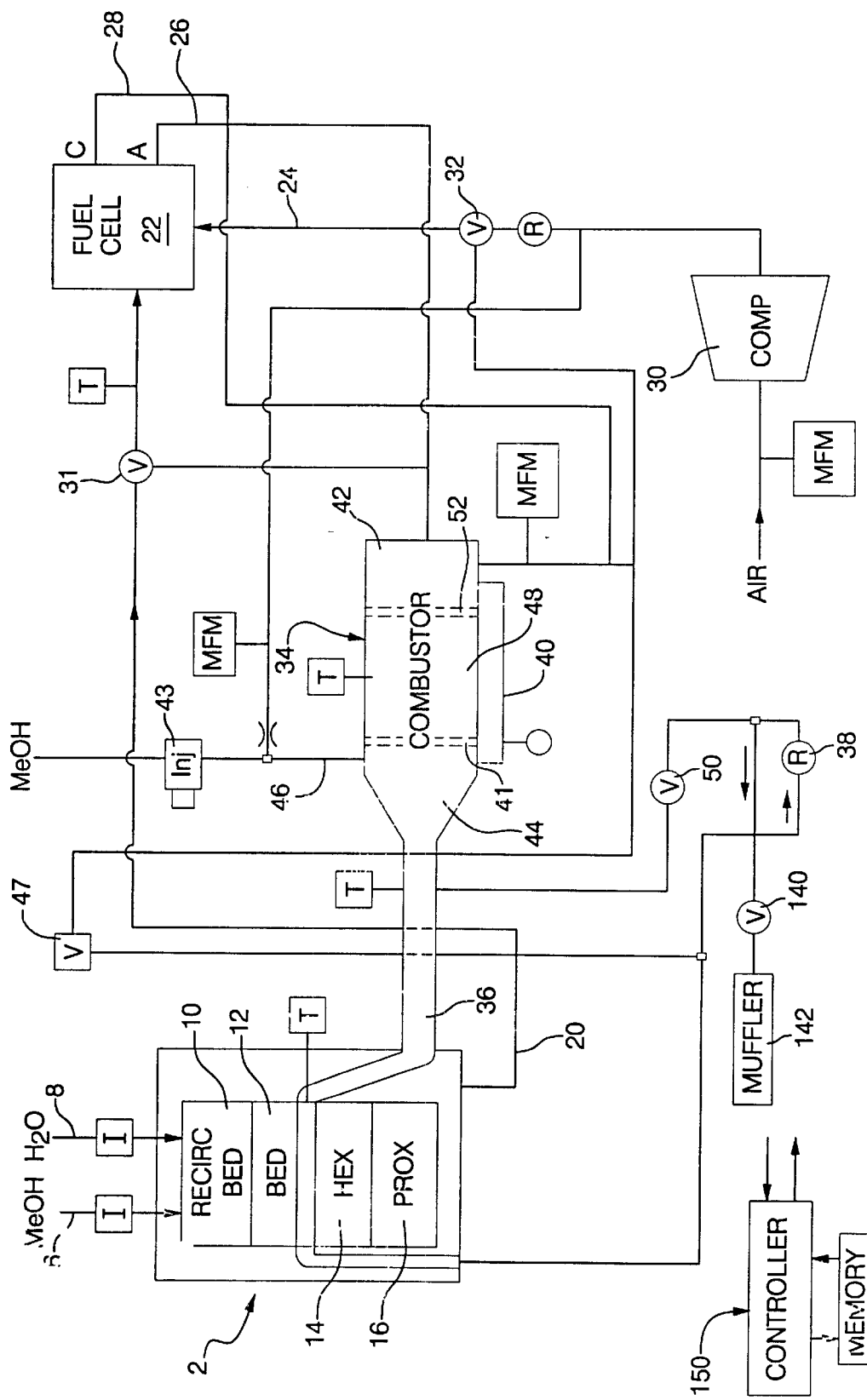
FIG. 1 is a drawing depicting a fuel cell apparatus which can utilize the fuel cell stack monitoring control method of the present invention.

This may be further understood with reference to the fuel cell system shown in FIG. 1 by example only. Therefore, before further describing the invention, it is useful to understand the system within which monitoring and control of fuel cell stack operation occurs.

FIG. 1 illustrates an example of a fuel cell system. The system may be used in a vehicle (not shown) as an energy source for vehicle propulsion. In the system, a hydrocarbon is processed, for example, by reformation and preferential oxidation processes to produce a reformate gas which has a relatively high hydrogen content on a volume or molar basis. Therefore, reference is made to hydrogen-rich or relatively high hydrogen content.

The invention is hereafter described in the context of a fuel cell fueled by a reformate prepared from methanol (MeOH). However, it is to be understood that the principles embodied herein are equally applicable to fuel cells fueled by other reformable hydrocarbon and hydrogen-containing fuels such as ethanol or gasoline.

As shown in FIG. 1, a fuel cell apparatus includes a fuel processor 2 for catalytically reacting methanol from a methanol stream 6, and water in the form of steam from a water stream 8 in a recirculating bed 10 and a catalytic bed 12 to form a hydrogen-rich reformate gas stream. A heat exchanger 14 is interposed between the catalytic bed 12 and a preferential oxidation (PrOX) reactor 16. The reformate output gas stream comprises primarily $H_2$ and $CO_2$, but also includes CO, water, methanol and methane. The reformate stream passes through the preferential oxidation (PrOX) reactor 16 to reduce the CO-levels therein to acceptable levels (i.e., below 20 ppm). The $H_2$ rich reformate 20 is then fed through valve 31 into the anode chamber of a fuel cell 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by a compressor 30 and is directed to the fuel cell 22 by a valve 32 under normal operating conditions. During start-up, however, the valve 32 is actuated to provide air to the input of a combustor 34 used to heat the fuel processor 2, as will be described in more detail hereinafter.

Heat from the heat exchanger 14 heats the catalyst bed(s) 10 and 12 in the fuel processor 2 and also heats the PrOX 16 during start up. In this regard, the $H_2O$-MeOH mixture supplied to the fuel processor 2 will be vaporized and preferably be recirculated/refluxed several times (e.g., 20 X) through the recirculating bed 10 in the fuel processor 2, the heat exchanger side of the bed 12, the PrOX 16 and the heat exchanger 14 such that the mixture also functions as a heat transfer medium for carrying heat from the heat exchanger 14 into the beds 10 and 12 of the fuel processor 2 and to the PrOX 16.

The heat exchanger 14 itself is heated from exhaust gases 36 exiting the catalytic combustor 34. The gases 36 exiting the heat exchanger 14 are still hot and could be passed through an expander, not shown, which could drive the compressor 30 or utilized in another manner. In the present implementation, as shown in FIG. 1, the exhaust gases from the fuel processor 2 pass through a regulator 38, a shutoff valve 140 and a muffler 142 before being released to the atmosphere.

MeOH vapor 40 emanates from a vaporizer 41 nested in the exhaust end 44 of the combustor 34. The vaporizer 41 is a heat exchanger that extracts heat from the combustor 34 exhaust to vaporize a first fuel stream, such as liquid MeOH 46 provided to the vaporizer 41 by fuel metering device 43 from the vehicle's fuel tank. The MeOH vapor 40 exiting the vaporizer 41 and the anode effluent 26 are reacted in a catalyst section 48 of the combustor 34 lying intermediate the inlet and exhaust ends 42 and 44 respectively of the combustor 34. Oxygen is provided to the combustor 34 either from the compressor 30 (i.e., via valve 32) or from a second air flow stream, such as a cathode effluent stream 28 depending on system operating conditions. A valve 50 permits dumping of the combustor exhaust 36 to atmosphere when it is not needed in the fuel processor 2.

Further details concerning the construction of the combustor 34 can be had by referring to pending U.S. patent applications Ser. Nos. 08/975,422, now U.S. Pat. No. 5,887,276, and 08/980,087, now U.S. Pat. No. 6,077,620, filed in the name of William Pettit in November 1997, the entire contents of which are incorporated herein by reference.

An electric heating element 52 is provided upstream of the catalyst bed 48 in the combustor 34 and serves to vaporize the liquid fuel 46 entering the combustor 34, heat the gas entering the bed 48 as well as preheating the bed 48 during start-up of the combustor 34. The heating element 52 may or may not be catalyzed. After start-up, as described hereafter, the electric heater 52 is no longer required since the fuel will be vaporized by the exhaust gases emanating from the exhaust end 44 of the combustor 34. A preferred electric heater 52 comprises a commercially available, uncatalyzed extruded metal monolith resistance element such as is used to light off the catalyst of a catalytic converter used to treat IC engine exhaust gases.

The exhaust end 44 of the combustor 34 includes a chamber that houses the vaporizer 41 which is a coil of metal tubing which is used to vaporize liquid fuel to fuel the combustor 34. More specifically, under normal post-start-up conditions, air or cathode effluent 28 may be introduced into the inlet end of the coil and mixed with liquid fuel sprayed into the inlet end via a conventional automotive type fuel injector. The airborne atomized fuel passes through the several turns of the heated coil tube, and therein vaporizes and exits the tube at an outlet which is located in the cathode effluent supply conduit. This vaporized first fuel stream supplements a second fuel stream or anode effluent 26 as fuel for the combustor 34 as may be needed to meet the transient and steady state needs of the fuel cell apparatus. In FIG. 1, the symbols are as follows: V is valve, MFM is mass flow meter, T is temperature monitor, R is regulator, C is cathode side, and A is anode side of fuel cell.

The amount of heat demanded by the fuel processor 2 which is to be supplied by the combustor 34 is dependent upon the amount of fuel input and ultimately the desired reaction temperature in the fuel processor 2. To supply the heat demand of the fuel processor 2, the combustor 34 utilizes all anode exhaust or effluent and potentially some liquid fuel. Enthalpy equations are used to determine the amount of cathode exhaust air to be supplied to the combustor 34 to meet the desired temperature requirements of the combustor 34 and ultimately to satisfy the fuel processor 2. The oxygen or air provided to the combustor 34 includes one or both of cathode effluent exhaust 28 which is typically a percentage of the total oxygen supplied to the cathode of the fuel cell 22 and a compressor output air stream depending on whether the apparatus is operating in a start-up mode wherein the compressor air stream is exclusively employed or in a run mode using the cathode effluent 28 and/or compressor air. In the run mode, any total air, oxygen or diluent demand required by the combustor 34 which is not met by the cathode effluent 28 is supplied by the compressor 30 in an amount to balance the enthalpy equations to reach the desired reaction temperature within the combustor 34 and to heat the fuel processor 2 to the desired temperature. The air control is implemented via an air dilution valve 47 which is a stepper motor driven valve having a variable orifice to control the amount of bleed-off of cathode exhaust supplied to the combustor 34.

The fuel cell apparatus operates as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34 as well as the input end of the vaporizer 41; (3) liquid fuel 46 (e.g., MeOH) is injected into the inlet end of the vaporizer 41 via a fuel injector, and atomized as fine droplets with the air flowing therein; (4) the air-MeOH droplet mix exits the vaporizer 41 and mixes with compressor air introduced into the combustor 34, and is then introduced into the input end 42 of the combustor 34; (5) the mix passes through a flame arrestor in the front of the combustor 34; (6) the mix is then heated by the heater 52 to vaporize the liquid droplets and heat the mixture; (7) the preheated vaporous mix then enters a mixing-media bed for still further intimate mixing before contacting the light-off catalyst bed; (8) upon exiting the mixing-media bed, the mix begins oxidizing on the light-off catalyst bed just before it enters a primary catalyst bed 48, or reacting section of the combustor 34, where substantially complete combustion of the fuel is effected; and (9) the hot exhaust gases exiting the catalyst bed are conveyed to the heat exchanger 14 associated with the fuel processor 2.

Once the reformer temperature has risen sufficiently to effect and maintain the reformation process: (1) valve 32 is activated to direct air to the cathode side of the fuel cell 22; (2) MeOH and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) air is introduced into the vaporizer 41; (7) liquid methanol is sprayed into the vaporizer 41; (8) the methanol-air mix circulates through the heated vaporizer coil where the MeOH vaporizes; (9) the methanol-air mix along with the cathode effluent 28 then mixes with the anode effluent 26; and (10) the mix is burned on the catalyst bed of the combustor 34.

During normal (i.e., post start-up) operating conditions, the heater 52 is not used as the vaporizer 41 alone vaporizes the MeOH and preheats the MeOH-air mix. Under certain conditions, as described hereafter, the combustor 34 could operate solely on the anode and cathode effluents, without the need for additional MeOH fuel from the vaporizer 41. Under such conditions, MeOH injection to the combustor 34 is discontinued. Under other conditions, e.g., increasing power demands, supplemental fuel is provided to the combustor 34.

As described above, the combustor 34 receives multiple fuels, such as a methanol-air mix as well as anode effluent 26 from the anode of the fuel cell 22. Oxygen depleted exhaust air 28 from the cathode of the fuel cell 22 and air from the compressor 30 are also supplied to the combustor 34.

According to the present fuel cell example, a controller 150 shown in FIG. 1 controls the operation of the combustor 34. Anode exhaust or effluent plus a liquid fuel, i.e., methanol, if required, support the energy requirements of the combustor 34. An enthalpy balance maintains the desired reaction by temperature controlling the amount of air and/or cathode exhaust supplied to the combustor 34 to meet all fuel processor heat requirements.

It should be noted that the energy requirements of the apparatus components are expressed herein in terms of power. This is for convenience and is meant to express an energy rate, often in units of kilowatts, rather than BTU per second.

The controller 150 may comprise any suitable microprocessor, microcontroller, personal computer, etc., which has central processing unit capable of executing a control program and data stored in a memory. The controller 150 may be a dedicated controller specific to the combustor 34 or implemented in software stored in the main vehicle electronic control module. Further, although the following description describes a software based control program for controlling the combustor 34 in various modes of operation or sequence, it will also be understood that the combustor control can also be implemented in part or whole by dedicated electronic circuitry.

The controller 150 controls the operation of the combustor 34 in six different modes or sequences of operation. The separate modes of operation include (1) combustor start-up, (2) combustor operation during fuel processor warm-up, (3) combustor operation during fuel processor start-up, with the fuel cell off-line, (4) combustor operation during fuel processor run mode with the fuel cell stack on-line, and (5) combustor shutdown.

Further details concerning the construction and operation of the above-described fuel cell apparatus can be had by referring to co-pending U.S. patent application Ser. No. 09/358,080, now abandoned, filed Jul. 21, 1999, in the names of David J. Hart-Predmore and William H. Pettit, the entire contents of which are incorporated herein by reference.

Figure 2:
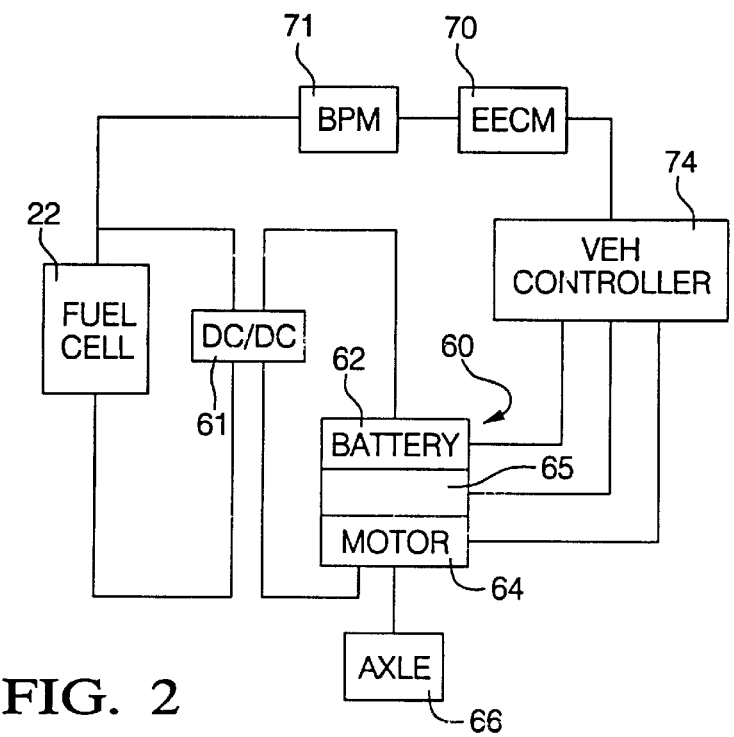
FIG. 2 is a drawing of the fuel cell apparatus shown in FIG. 1 connected in a pictorial representation of a use application.

In a preferred embodiment, the fuel cell system comprises the fuel cell 22 as part of a circuit 60 (see FIG. 2) wherein a portion of the external circuit 60, comprises a battery 62, and an electric motor 64, and associated drive electronics 65 constructed and arranged to accept electric energy from a DC/DC converter 61 associated with the fuel cell 22 and to convert it to mechanical energy produced by motor 64. The battery 62 is constructed and arranged to accept and store electrical energy supplied by fuel cell 22 and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls operation of the battery 62, the electric motor 64, and the drive electronics 65.

Figure 4:
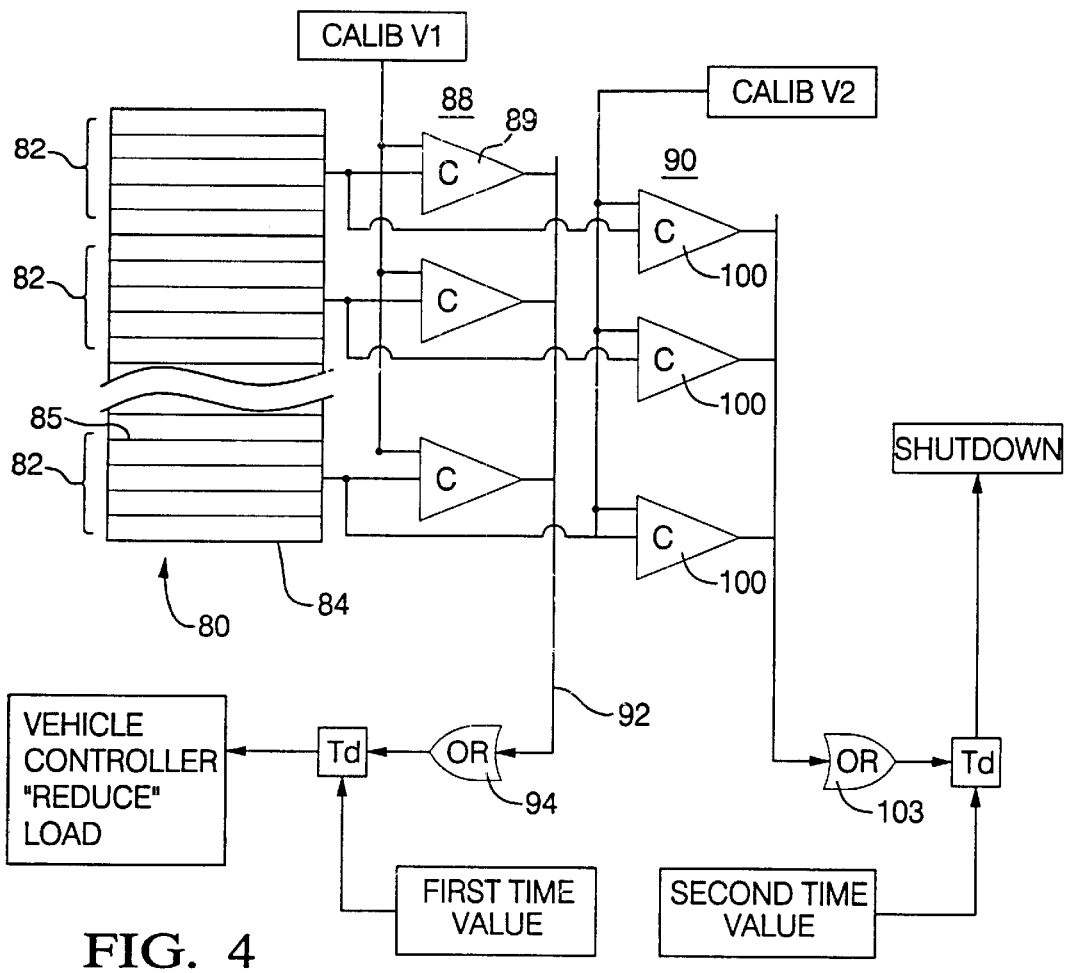
FIG. 4 is a logic diagram of software for implementing the process described with reference to FIG. 3.
Figure 5:
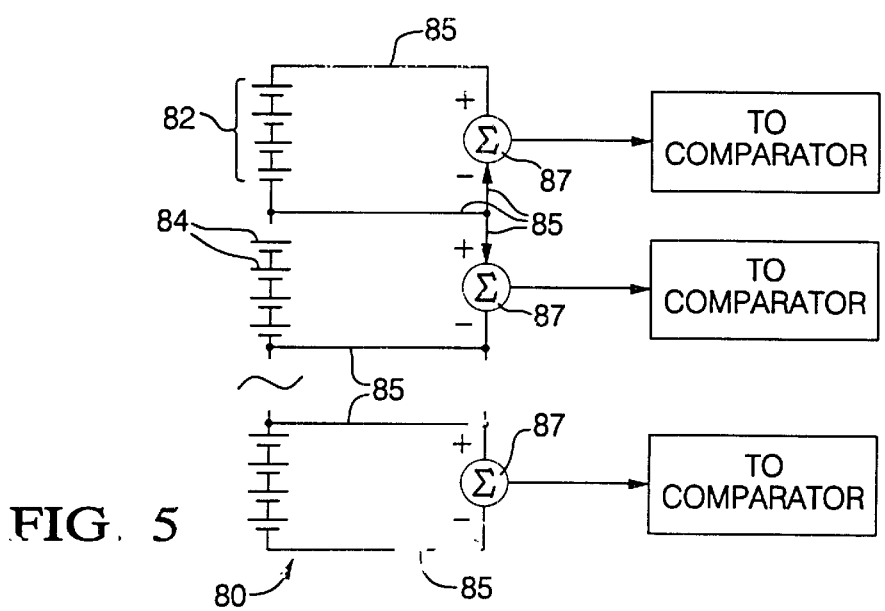
FIG. 5 is a drawing showing an exemplary arrangement of cells of a fuel cell stack with connections for voltage monitoring.

The term "fuel cell" is often used to refer to an individual cell and also may refer to a fuel cell stack which contains many individual fuel cells often on the order of one hundred or more, connected in series. A fuel cell stack, which contains many individual fuel cells is illustrated by the details of FIGS. 4 and 5. Thus, fuel cell 22 of FIGS. 1 and 2, in a typical arrangement, consists of many cells called a stack 80 (FIGS. 4 and 5). The fuel cell stack 80 consists of a plurality of cells 84, connected in series (FIGS. 4 and 5). Each cell 84 within the stack comprises the membrane electrode assembly described earlier, and each such MEA provides its increment of voltage. A group of cells within the stack is referred to as a cluster 82.

The electric motor which converts electric energy from the fuel cell into mechanical energy places a demand (load) on the fuel cell stack. If the rate of increase of the load on the fuel cell stack is too great, the fuel cell stack cell voltages may drop. Deterioration or degradation of one or more cells may result. This may also result in cell reversal, which could permanently degrade the capability and efficiency of the fuel cell stack and system.

The overall voltage of the stack can be monitored to provide a determination of its operating condition. However, this does not provide information on a specific cell within the stack. Although it is possible and within the scope of the invention to monitor the voltage of an individual cell, it is more efficient and economical to monitor the voltage of a cluster of cells, to minimize hardware and/or software. The monitoring of cells individually is more hardware intensive, and the monitoring of clusters of cells is more software intensive, utilizing statistical analysis.

In one preferred embodiment, the voltage of a cluster of fuel cells is monitored. Such monitoring is conducted by the battery pack monitors (BPMs) and the EECM (electrochemical engine control module) according to the figures. If any of the cluster voltages drop below a predetermined value as stored in the memory of the EECM, a message is sent to the vehicle load controller. This message is an indication that the fuel cell stack voltage(s) are too low. The load controller responds or adjusts by reducing the rate of increase of the load, or halts the increase, or requests a reduced load from the vehicle controller, in order to avoid a diagnostic shutdown due to ultra-low cluster voltages. In one aspect, if any of the cluster voltages drop below such predetermined value, the load controller has the opportunity to slow, pause or reduce the load. Subsequently, when the fuel cell cluster voltages return to an expected normal operating mode, the load rate can be increased. In another aspect, a second predetermined value is established to be a low voltage condition which is more undesirable and requires system shutdown. This second predetermined voltage value is lower than the aforesaid first predetermined voltage value at which load shedding occurs.

Figure 3:
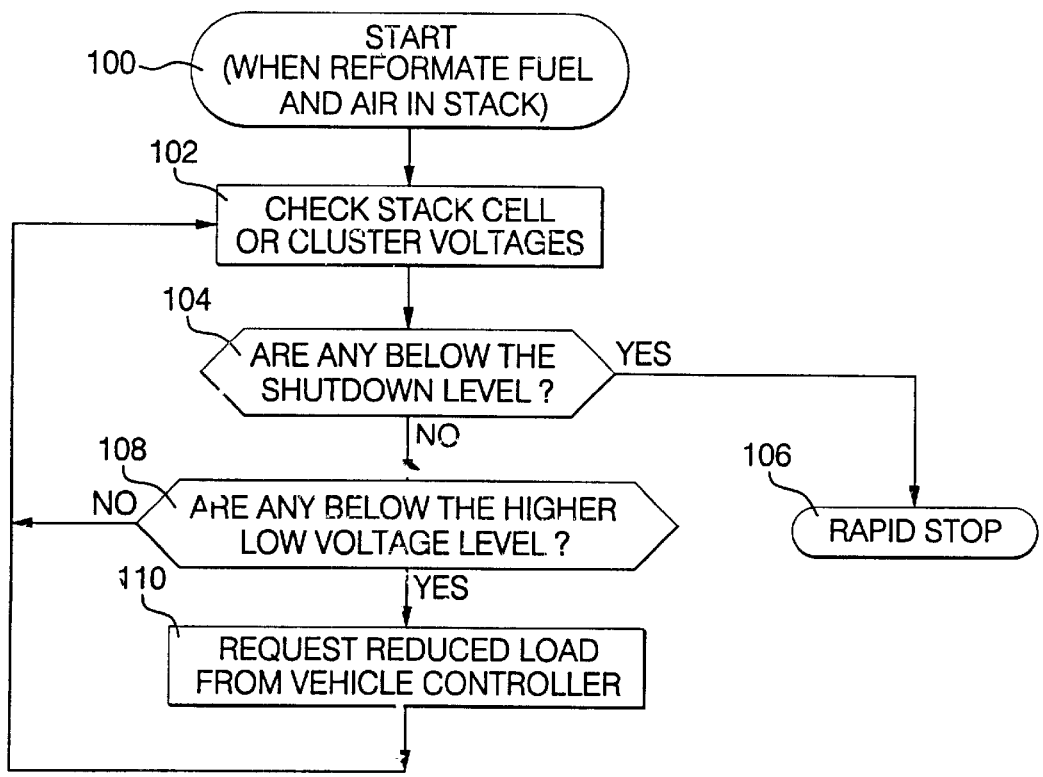
FIG. 3 is a flow diagram depicting an implementation of fuel cell stack monitoring and control.

The BPM and EECM together comprise the monitoring and control system which implements the process and contains the necessary hardware and software for receiving inputs and comparing the inputs to preselected values, to periodically carry out the process described with reference to FIGS. 3 and 4 at predetermined intervals, for example, every 10 milliseconds. Turning to FIG. 3, there is depicted a preferred sequence of program steps performed by the EECM (electrochemical engine control module) controller to monitor a low voltage condition and take adjustive action by shedding load and to monitor an ultra-low voltage condition which requires system shutdown.

The EECM and other components of the monitoring and control system process respective signals obtained from clusters of cells to provide an appropriate output control signal. The monitoring and control system contains values stored in memory which are preselected calibration voltage values for comparison to the voltage levels of respective cell clusters. In a preferred embodiment, the calibration voltage values of the look up table correlate with respective operating load values. The operation of the monitoring and control system for monitoring cell voltage starts at step 100 when reformate fuel and air are provided to the stack to commence operations. In step 102 (FIG. 3), the. BPM and EECM check the stack cell or cluster voltages. As stated earlier, the system is able to be configured so that BPM and EECM monitor respective voltages from groups of cells (cluster), or it monitors the voltage level of each individual cell in the stack. In step 104, the BPM and EECM determine whether any of the monitored voltages are below a predetermined level designated for shutdown, referred to as an ultra-low voltage. If any of the monitored voltages are below the ultra-low voltage level indicated for shutdown in the calibration table, then a rapid stop sequence 106 is initiated to stop the fuel cell system.

In one alternative, a rapid stop or shutdown due to ultra-low voltage comprises the step of removing the hydrogen stream from the system by releasing the hydrogen stream to the atmosphere. This arrangement removes the hydrogen stream immediately and efficiently from the system and maintains the integrity of the system. As an alternate, the step of removing the hydrogen stream from the system in a rapid stop or shutdown scenario may comprise routing the hydrogen stream to a storage facility. Again, this has the effect of quickly and efficiently removing the hydrogen stream from the system to maintain the integrity of the system from the ultra-low voltage condition. In still another alternative, the hydrogen remains in the stack, but the load on the stack is removed.

If the monitored voltages are not an ultra-low value, then in the sequence according to step 108 the EECM 70 determines whether any of the monitored voltages are below a preselected first or relatively higher low voltage level. If any such voltages are below the predetermined first or relatively higher low voltage level, then in step 110 a signal is sent to the vehicle controller 74 requesting reduced load from the vehicle controller. Next, the sequence of steps is repeated beginning with step 102. Returning back to step 102, if all of the monitored voltages are at acceptable levels, at or above the first or higher low voltage level, then the sequence of steps, beginning at 102 is repeated, for example, every 10 milliseconds or less.

Referring to FIG. 4 there is shown an exemplary control diagram for carrying out the sequence of steps shown in FIG. 3. FIG. 4 shows a fuel cell stack 80 comprising a plurality of cell clusters 82. Each cell cluster comprises four individual cells 84. Electrical conductors for respective cells or clusters provide a voltage reading, as data, to the BPM and EECM, using a first set of software comparators 88 and a second set of software comparators 90. The invention will be further described with reference to the preferred monitoring of cell clusters. It is to be understood that it is equally applicable to monitoring individual cells.

FIG. 5 is a pictorial drawing showing cells of a fuel cell stack 80 arranged in clusters 82 with connections 85 to clusters 82 for voltage monitoring. In the drawing, several clusters 82 are able to be monitored individually and essentially simultaneously. In this exemplary arrangement, each cluster 82 consists of four individual cells 84. Cells 84 within the stack 80 are arranged in series. For each cluster, conductors 85 connect a positive electrode and a negative electrode end to a summing device or summation node 87. Each summing node 87 provides a cumulative voltage for its respective cluster 82. The output of the summer is then directed into a software comparator. The number of cells 84 per cluster 82 may be more or less than the exemplary arrangement of four.

The first group of comparators 88 is comprised of respective voltage comparators 89. Each software comparator 89 compares two voltage values, the first being the monitored voltage from a cluster of cells 82 and the second being a first calibration or relatively higher low voltage level shown on FIG. 4 as CALIBV1. An output signal from the first group of software comparators is fed through signal 92 to OR 94 and is at a high logic state when one or more of the voltage inputs monitored and supplied through any one software comparator 89 is less than the calibration or relatively higher low voltage level CALIBV1. OR 94 performs a logical function OR. If the monitored voltage from any one or more of clusters 82 is less than the calibration value V1, then a high logic output signal from the OR is sent to the vehicle controller requesting a load reduction. However, the output signal from OR 94 is subject to a first time delay (Td) before a load reduction sequence is initiated. Time delay provides the opportunity to screen out any noise or errant signals.

Turning now to the second group of comparators 90, each software comparator 100 receives a voltage input from a cell cluster 82 and compares that monitored voltage to a second calibration or ultra low voltage level CALIBV2. Each software comparator 100 compares the monitored voltage with the calibration or ultra low voltage level CALIBV2 and provides an output signal to OR 103 when CALIBV2 is higher than the monitored voltage. OR 103 is a device which generates an output when input corresponding to one or more of the monitored voltages is below the calibration level CALIBV2 causing gate 103 to be at a high logic state. If the monitored voltage from any one or more of clusters 82 is less than the calibration value or ultra low voltage level CALIBV2, then a signal is sent to shutdown the fuel cell system. However, the output signal from OR 103 is subject to a second time delay (Td). This Td may be the same or a different value from the first Td.

The control system of the present invention is particularly important where a fuel cell system does not directly monitor the rate of hydrogen flow to the fuel cell; that is, in cases where there is not a hydrogen sensor directly upstream of the fuel cell. In a fuel cell system it is important to match the load being demanded of a system with the rate at which reformate gas is supplied to the fuel cell. If it is attempted to draw more current out of the fuel cell then it is capable of supplying because there is not enough hydrogen to create electrical power, this may exceed the acceptable working range of the fuel cell stack and adversely affect the integrity of the stack. Exceeding the acceptable working range of the stack may result in breakdown of the membrane, polymer components. Therefore, it is advantageous to have an early detection system to indicate the situation where an amount of current is being drawn corresponding to the load demanded, yet stack voltage begins to drop.

The consequence of the absence of such a system is that if the vehicle propulsion system continues to drive the load and lets the cell voltage continue to decline, the cell may exceed an acceptable working range and may reverse polarity permanently. In this situation, the cell begins acting as a resistor and may begin heating up. If the cell continues to heat up, it may adversely affect the cell next to it and if heat effect is not abated, the cell may exceed an acceptable physical range of the materials and adversely affect the integrity of the cell and stack.

Although it is possible to obtain the overall voltage of the fuel cell stack, this does not indicate the existence of a an undesirable condition of a cell within the stack. In other words, a small voltage drop occurring at a number of the cells could not be distinguished from a large voltage drop in a particular cell. In one embodiment of the invention it is possible to monitor the voltage of each individual cell. However, from an economic point of view, this is not strictly necessary and desired. Therefore, the system of the invention in its preferred embodiment monitors voltage for a group of cells (on the order of four cells). This is adequate to provide a signal to the vehicle controller to reduce load to compensate for a voltage drop condition. The load controller is then able to reduce the rate of increase of the load, or halt the increase, in order to avoid a diagnostic shutdown due to ultra-low cluster voltages. By feeding back the state of the fuel cell to the load controller, the load controller can slow or pause the rate of increase in the load, and when the fuel cell cluster voltages return to normal, the load rate can be increased. Such monitoring of clusters is also thought to be adequate to maintain the integrity of the fuel cell stack by detecting an ultra-low voltage condition and signaling the need to shutdown the system.

It is contemplated that in the case where the system is readjusted to operate at a lower load, it will be possible to continue to propel the vehicle in a "limp home" mode under reduced power. In some cases, it may be possible to depend upon the power supplied from the battery along with power supplied from the fuel cell stack to propel the vehicle.

It is also contemplated that in some applications the monitored cluster voltages may be compared to a preselected value rather than the two preselected values as per the preferred embodiment described herein. In this alternative, the method consists of monitoring the voltage of one or more cells; comparing the monitored voltage to a preselected value as a function of load; determining if the monitored voltage is less than or equal to the preselected value; and then sending a signal indicative of such condition.

The invention provides many advantages over existing alternatives available for addressing low and ultra-low voltage situations. In one existing alternative, for example, at the onset of a low voltage condition, one present strategy is to significantly increase the amount of hydrogen sent to the fuel cell stack thereby increasing the amount of excess hydrogen, referred to as lambda, during low voltage transients. This is less desirable since using a higher anode lambda would consume more hydrogen making the fuel cell system less efficient, precipitate the need for a larger fuel processor, and may increase the cost and size of the system. Another option is to ignore the low cluster voltage readings during load transients. This option is less desirable and doesn't maintain continuous monitoring over the clusters or stack. A third option is to monitor the voltage across the entire stack and feed this back to the vehicle load controller. This option is less desirable since the fuel cell stack overall voltage may not accurately reflect an undesirable condition within a single cell or a cluster of cells. This is evident by an example where the fuel cell stack might have, for example, 200 cells at 0.7 to 0.8 volts each at a given load. In a circumstance where 3 cells each drop from 0.75 volts to 0.0 volts the overall fuel stack voltage changes from 150 volts to 147.75 volts. This latter value is well above the expected voltage if all of the cells were at 0.7 volts, that is, at the lower range indicating a stack voltage of 140 volts which is nominally acceptable.

Thus, the method and system of the present invention are most preferred over the existing options since, by the present invention, the system is able to send a signal to the load controller that stack voltages are too low, providing the opportunity to adjust by reducing the rate of increase of load or halt or shed some of the load, thereby modulating the load in response to stack voltage to maintain an acceptable working range and the integrity of the stack. It is evident that by the method of the invention, set points for triggering adjustive action can be either reactive or proactive, since the calibration values are preselected.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. In a method for operating a fuel cell system having a fuel processor which supplies a hydrogen-rich stream to a stack of fuel cells, wherein said hydrogen reacts with oxygen to supply electrical power to an external load, the improvement comprising:

(a) monitoring the voltage of at least one of said cells;

(b) comparing said monitored voltage to first and second preselected values that are selected based on a value of the external load, where the second preselected value is less than the first preselected value;

(c) generating a first signal if said monitored voltage is less than said first preselected value and greater than or equal to said second preselected value;

(d) generating a second signal if said monitored voltage is less than said second preselected voltage;

(e) reducing the external load when said first signal is generated; and (f) terminating the supply of power to the external load when said second signal is generated.

2. The method of claim 1 further comprising generating said first signal only if said monitored voltage is less than said first preselected value and greater than said second preselected value for a first period.

3. The method of claim 1 wherein said first preselected value is selected to correspond to a rate at which said stack is operable to consume said hydrogen-rich stream to satisfy said reduced load.

4. The method of claim 1 further comprising generating said second signal only if said monitored voltage is less than said second preselected value for a second period.

5. The method of claim 1 wherein said second preselected value is selected to prevent deterioration of at least one of said cells in said stack.

6. The method of claim 1 wherein step (a) is conducted by monitoring the voltage of a cluster of cells.

7. The method of claim 6.wherein several cluster voltages are monitored individually for respective clusters of cells.

8. The method of claim 1 wherein said preselected values are a function of load on the fuel cell stack.

9. The method of claim 8 wherein different preselected values are established for different loads.

10. In a method for operating a fuel cell system having a fuel processor which supplies a hydrogen-rich stream to a stack of fuel cells, wherein said hydrogen reacts with oxygen to supply electrical power to an external load, the improvement comprising:

(a) monitoring the voltage of at least one of said cells;

(b) comparing the monitored voltage to first and second preselected values that are selected based on a value of the external load, wherein the second preselected value is less than the first preselected value;

(c) generating a first signal if the monitored voltage is less than the first preselected value and greater than the second preselected value; and (d) generating a second signal if the monitored voltage is less than the second preselected value.

11. The method of claim 10 and further including reducing the external load when said monitored voltage is less than said first preselected value and greater than or equal to said second preselected value.

12. The method of claim 11 wherein said first preselected value is selected to correspond to a rate at which said stack is operable to consume said hydrogen-rich stream to satisfy said reduced load.

13. The method of claim 10 and further including terminating the supply of power to the external load when said monitored voltage is less than said second preselected value.

14. The method of claim 13 wherein a second preselected value is selected to prevent deterioration of one or more of said cells in said stack.

15. The method of claim 10 wherein step (a) is conducted by monitoring the voltage of a cluster of cells.

16. The method of claim 15 wherein several cluster voltages are monitored individually for respective clusters of cells.

17. The method of claim 10 wherein said preselected values are a function of load on the fuel cell stack.

18. The method of claim 17 wherein different preselected values are established for different loads.

19. The method of claim 10 further comprising generating said first signal only if said monitored voltage is less than said first preselected value and greater than said second preselected value for a first period.

20. The method of claim 10 further comprising generating said second signal only if said monitored voltage is less than said second preselected value for a second period.

* * * * *